United States Patent [19]
Factor et al.

[11] Patent Number: 4,680,232
[45] Date of Patent: Jul. 14, 1987

[54] ABRASION AND UV RESISTANT COATING COMPOSITIONS

[75] Inventors: Arnold Factor, Scotia; Gautam A. Patel, Clifton Park, both of N.Y.

[73] Assignee: General Electric Company, Schenectady, N.Y.

[21] Appl. No.: 815,614

[22] Filed: Jan. 2, 1986

[51] Int. Cl.⁴ .................. B32B 9/04; B32B 13/12; B32B 27/36; C09K 3/14
[52] U.S. Cl. .................. 428/412; 106/287.12; 106/287.13; 106/287.14; 106/287.16; 106/287.19; 106/287.24; 428/447; 428/451
[58] Field of Search .......... 106/287.12, 287.13, 106/287.14, 287.16, 287.19, 287.24; 428/412, 447, 451

[56] References Cited
U.S. PATENT DOCUMENTS

| | | | |
|---|---|---|---|
| 4,278,804 | 7/1981 | Ashby et al. | 556/436 |
| 4,313,979 | 2/1982 | Frye et al. | 106/287.13 |
| 4,390,373 | 6/1983 | White et al. | 106/287.12 |
| 4,500,669 | 2/1985 | Ashlock et al. | 524/440 |

Primary Examiner—Michael R. Lusignan
Attorney, Agent, or Firm—Francis T. Coppa; James C. Davis, Jr.; James Magee, Jr.

[57] ABSTRACT

Abrasion resistant coating compositions with improved weatherability are described which comprise water/alcohol solutions of a partial condensate and a colloidal dispersion of colloidal silica and colloidal metal. Improved weatherability is provided by a silylated ultraviolet light absorbing agent which is incorporated in the coating.

14 Claims, No Drawings

ABRASION AND UV RESISTANT COATING COMPOSITIONS

BACKGROUND OF THE INVENTION

This invention relates to silicone resin coating compositions. More particularly, it relates to silicone coating compositions which provide transparent, abrasion-resistant coatings with improved resistance to ultraviolet radiation. The coatings provided are more weatherable than those previously available.

The substitution of glass with transparent materials which do not shatter has become widespread. For example, transparent glazing made from synthetic organic polymers is now utilized in public transportation vehicles, such as trains, buses and airplanes. Lenses for eyeglass and other optical instruments, as well as glazing for large buildings, also employ shatter resistant transparent plastics. The lighter weight of these plastics in comparison to glass is a further advantage, especially in the transportation industry where the weight of the vehicle is the major factor in its fuel economy.

While transparent plastics provide the major advantage of being more resistant to shattering and lighter than glass, a serious drawback lies in the ease in which these plastics mar and scratch due to everyday contact with abrasives, such as dust, cleaning equipment and/or ordinary weathering. Continuous scratching and marring results in impaired visibility and poor aesthetics, often requiring replacement of the glazing or lens.

Attempts have been made to improve the abrasion resistance of these transparent plastics. For example, coatings formed from mixtures of silica, such as colloidal silica or silica gel, and hydrolyzable silanes in a hydrolysis medium have been developed to impart scratch resistance. U.S. Pat. Nos. 3,708,225, 3,986,997, 3,976,497, 4,368,235 and 4,324,712, describe such compositions and are incorporated herein by reference.

Coating formulations which contain a metal, metal alloy, or metal salt colloidal dispersant such as those of antimony, aluminum, gold, silver, copper, tin, cadmium and indium have been found to provide coatings which are more abrasion resistant than coatings which contain only colloidal silica. Such formulations are described in more detail in U.S. Pat. Nos. 4,442,168, 4,390,373 and 4,500,669, assigned to Swedlow, Inc. The contents of these patents are incorporated herein by reference.

While these coating formulations containing colloidal metal dispersants provide improved mar resistance, there still remains room for improvement. For example, this invention provides coatings with improved weatherability as well as improved mar resistance. These coatings have an added degree of weathering resistance which does not exist in the abrasion resistant coatings provided in the patents assigned to Swedlow, Inc. referred to above.

UV stabilized coating compositions containing silylated UV screening agents have been disclosed by Ashby et al. in U.S. Pat. No. 4,278,804. The compositions of Ashby et al. do not contain the colloidal metals, metal alloys or metal salts utilized in these compositions to enhance mar resistance. It has been discovered that the use of these reactive UV absorbers is not deleterious to the mar resistant properties of the coatings.

SUMMARY OF THE INVENTION

A composition is provided by this invention which comprises a water/aliphatic alcohol solids dispersion of a partial condensate derived from organotrialkoxysilane, and a colloidal dispersion of colloidal silica and a colloidal metal, colloidal metal alloy or colloidal metal salt, said metal being selected from the group consisting of antimony, aluminum, gold, silver, copper, tin, cadmium and indium and a silylated ultraviolet light absorbing agent having the formula

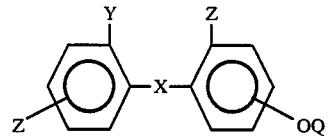 I wherein
X is

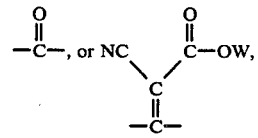

Y is H or OH; Z is H, OH, OQ or OW, where at least one Z in the ortho position is OH if Y is H;
Q is —CH$_2$(CH$_2$)$_n$Si(R'')$_x$(OR''')$_y$ and W is —C$_m$H$_{2m+1}$;
where x is 0, 1 or 2, y is 1, 2, or 3, x+y=3, n=0, 1 or 2, m=1 to 18, R'' is alkyl having 1 to 6 carbon atoms and each R''' is independently selected from the group consisting of alkyl or alkanoyl having 1 to 6 carbon atoms.

OBJECTS OF THE PRESENT INVENTION

It is an object of the present invention to form transparent coatings with high abrasion resistance and improved resistance to weathering.

It is a further object of the present invention to provide a coating composition which utilizes colloidal metals, such as antimony oxide and a reactive silylated UV absorber compound.

Further objects will be obvious in view of the detailed description below.

DETAILED DESCRIPTION OF THE INVENTION

The silicone resin coating compositions of this invention contain an aqueous dispersion of colloidal silica, colloidal metal and the hydrolysis products of organotrialkoxysilane. This hydrolysis product is maintained in an aqueous/alcohol solution. Coating compositions of this invention will form an abrasion-resistant, UV-resistant coating upon condensation of the hydrolysis product.

The metal colloids which can be dispersed in the aqueous/alcohol solution include antimony, aluminum, gold, silver, copper, tin, cadmium and indium. The terms "metal colloids" and "colloidal metal" include the colloidal metal alloys and colloidal metal salts. Suitable alloys are mixtures of the above metals, such as tin-antimony, tin-indium and tin-cadmium alloys. Suitable metal salts are oxides, nitrides, phosphates, sulfides, hydroxides or acetates of the above metals. These include antimony oxide, aluminum oxide, aluminum acetate, tin-antimony oxide and the like. Similar colloidal dispersions are expected to be suitable in the practice of this invention and obvious to one skilled in the art. The common characteristic of these metal colloidal dispersants are that they are water insoluble. These metal colloidal dispersants function to improve the hardness of the coating.

Preferably, if the metal colloidal dispersant has a refractive index of about 1.5, the average colloidal particle size is about 200 Angstroms, whereas if the refractive index is 2.0 or greater, the average colloidal particle size should be about 100 Angstroms or less. These smaller sizes for the colloidal particles are desired for the improved optical clarity. The preferred metal colloidal dispersant is antimony oxide, $Sb_2O_5$. A suitable colloidal antimony oxide is commercially available under the tradename "Nyacol A-1510LP" from Nyacol, Inc., Ashland, Mass.

The aqueous dispersions of colloidal silica which can be utilized in the present invention have a particle size of from about 5 to 150 millimicrons and preferably from about 10 to 30 millimicrons average diameter. Such dispersions are known in the art and commercially available ones include, for example, those under the trademarks of Ludox (Dupont) and Nalcoag (Nalco Chemical Company). Such dispersions are available in the form of acidic and basic hydrosols. The pH of these colloidal silicas can be adjusted by the addition of acid or base where desired. The colloidal silicas utilized can include those which are stabilized by a volatile base such as ammonia (ammonium hydroxide) and alkyl amines such as methylamine, ethylamine, t-butylamine and the like.

Where colloidal antimony oxide is used, the ratio of colloidal silica to colloidal antimony preferably falls within the range of about 98:2 to about 70:30 and most preferably 90:10 to 70:30. Higher concentrations of colloidal antimony oxide are believed to be deleterious to the mar resistant properties of the final coating composition. In addition, compositions having a weight ratio of about 50:50 colloidal antimony oxide to colloidal silica provide poor adhesion to substrates. When introducing these colloidal dispersions to the coating composition, it is preferable to do so separately. Combining the colloidal antimony oxide and the colloidal silica before their introduction to the organotrialkoxysilanes can result in irreversible precipitation of colloidal particles.

The partial condensate within the coating composition is provided by organotrialkoxysilanes of the formula

wherein R is a monovalent radical selected from the group consisting of alkyl radicals of from 1 to 8 carbon atoms and aryl radicals of from 6 to 20 carbon atoms and R' is a monovalent radical selected from the group consisting of alkyl radicals of from 1 to 3 carbon atoms and aryl radicals of from 6 to 13 carbon atoms. Examples of species within the scope of R' include vinyl, phenyl, γ-glycidoxypropyl or γ-methacryloxypropyl.

In preparing the coating compositions of this invention, an organotrialkoxysilane of the formula indicated above is admixed either with the colloidal silica dispersion or the metal colloid dispersion. Silanols, R'Si(OH)$_3$, wherein R' is as described above, are formed in situ upon admixing. The alkoxy functional groups, such as methoxy, ethoxy, isopropoxy, n-butoxy and the like, are hydrolyzed in this mixture and liberate the corresponding alcohol, such as methanol, ethanol, isopropanol, n-butanol, and the like. Substantially all of the alkoxysilane is hydrolyzed to form a corresponding silanol and alcohol; however, a minor portion of these alkoxy functional groups may remain unhydrolyzed without departing from this invention.

Hydrolysis may be achieved under acidic or basic conditions at a temperature in the range between 20° C. to 40° C., preferably below 25° C. A reaction time of about 6 to 8 hours is usually sufficient to react enough organotrialkoxysilane such that the initial two-phase liquid mixture has been converted to a single phase in which the colloids are dispersed. Hydrolysis may be permitted to continue for a period of about 8 to 48 hours. As a rule, the longer the time permitted for hydrolysis, the higher the final viscosity.

Upon generating the hydroxyl substituents of these silanols, a condensation reaction begins to form silicon-oxygen-silicon bonds. This condensation reaction is not exhaustive. The siloxanes produced retain a quantity of silicon-bonded hydroxy groups, typically about at least one for every two SiO units, which is why the polymer is soluble in the water-alcohol solvent mixture. This soluble partial condensate can be characterized as a siloxanol polymer having silicon-bonded hydroxyl groups and —SiO— repeating units.

A major portion of the partial condensate is obtained from $CH_3Si(OR)_3$, depending on the input of ingredient to the hydrolysis reaction. Higher molecular weight organic radicals for R' can hinder the crosslinking of the silanol, resulting in a softer coating. The partial condensate preferably comprises at least about 30 weight percent methyltrisilanol and more preferably at least about 70 weight percent methyltrisilanol, which is generated from the methyltrialkoxy described above. The most preferred coating compositions comprise 100 weight percent of methyltrisilanol. Minor amounts of the partial condensate can be derived from $C_2H_5Si(OR)_3$, $C_3H_7Si(OR)_3$, $C_6H_5Si(OR)_3$ and the like.

Coating compositions according to the present invention are preferably prepared by dispersing colloidal antimony oxide and colloidal silica in separate aqueous or aqueous/alcohol solutions to form a hydrosol. Both hydrosols are then sequentially mixed with a solution of the organotrialkoxysilane in the presence of acid. The admixture contains a sufficient amount of acid to provide a pH preferably ranging from about 3 to about 6. At a lower or higher pH, the colloidal particles tend to precipitate out. A pH of about 4 to 6 and especially about 5.5 is particularly preferred to provide a stable shelf life of about 7 to 8 weeks at ambient temperatures. The acid is preferably an organic acid, such as acetic acid, since organic acids evaporate readily as the coating is drying and enhance adhesion of the coating to the substrate. Other suitable organic and inorganic acids are disclosed in Clark, U.S. Pat. No. 3,986,997, the disclosure of which is incorporated herein by reference.

After hydrolysis and partial condensation, the mixture preferably contains enough alcohol to form a water-alcohol solid system to ensure the solubility of the partial condensate. The solids content of the composition can be adjusted by adding additional water or other suitable solvents. Alcohols are suitable solvents, particularly lower aliphatics, i.e., those having 1 to 6 carbon atoms, such as methanol, ethanol, propanol, isopropanol, isobutyl alcohol, t-butyl alcohol and the like, or mixtures thereof. Isopropanol and n-butanol are particularly preferred. Other alcohols can also be utilized in the practice of this invention.

After adjustment with solvent, the coating compositions of this invention preferably contain from about 10 to 50% by weight solids, most preferably about 20% by weight solids. Of these solids, about 5 to about 70 weight percent comprise the combined colloidal dispersion and about 30 to 95 weight percent comprise the partial condensate. As indicated above, where antimony oxide is used, the combined colloidal dispersion preferably contains a weight ratio of less than or equal to about 70:30 colloidal silica to colloidal antimony oxide.

The coating compositions of this invention will cure on a substrate within from about 1 hour to 24 hours at temperatures in the range of about 140° F. to about 300° F. Milder curing conditions or an accelerated cure time can be achieved by the addition of a buffered or latent condensation catalyst. It is well known that coating compositions containing commercially available alkaline colloidal silica will generate cure catalysts in situ when the pH is adjusted below a value of about 8. The pH is typically adjusted with a carboxylic acid, generating carboxylate catalysts from the alkaline species.

The amount of catalyst present preferably comprises from about 0.05 weight percent to about 2.0 weight percent of the coating composition and most preferably 0.1% by weight. Suitable condensation catalysts include choline acetate, sodium acetate, ethanolamine acetate and benzyltrimethylammonium acetate. When these additional cure catalysts are utilized, cure times can be reduced to about 30 minutes.

The UV light absorbing agents which provide enhanced weatherability are silylated compounds of the basic formula

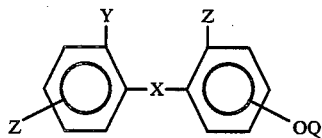

wherein
X is

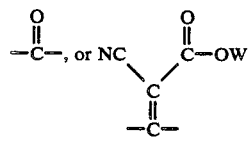

Y is H or OH; Z is H, OH, OQ or OW, where at least one Z in the ortho position is OH if Y is H;
Q is —CH$_2$(CH$_2$)$_n$Si(R")$_x$(OR''')$_y$ and W is —C$_m$H$_{2m+1}$;
where x is 0, 1 or 2, y is 1, 2, or 3, x+y=3, n=0, 1 or 2, m=1 to 18, R" is alkyl having 1 to 6 carbon atoms and each R''' is independently selected from the group consisting of alkyl or alkanoyl having 1 to 6 carbon atoms.
Preferably, X is

Y is H and one ortho-positioned Z is OH. The value for x is preferably 0 with y being 3 and n being 2. The OQ radical is preferably para-positioned with respect to the carbonyl.

Furthermore, it is preferable that the R''' radicals are a combination of methyl and ethyl, most preferably in a ratio of about 4:1 to 6:1 within the coating composition. These silylated UV stabilizers are made by equilibrating a methanol solution of an ethoxy substituted silylated UV absorbing agent of formula I. This procedure is more particularly described by Anthony in U.S. Pat. No. 4,495,360.

These ultraviolet light absorbing agents are more particularly described by Ashby et al. in U.S. Pat. No. 4,278,804, by Frye in U.S. Pat. No. 4,299,746 and by Anthony in U.S. Pat. No. 4,495,360, all assigned to the same assignee as the present invention and all incorporated herein by reference.

These ultraviolet light absorbing agents can be used in amounts of from about 1.0 to about 40 and preferably from about 5 to 20 parts by weight per 100 parts of the resulting hardcoat formulation on the basis of solids.

Other ingredients which may be included within the coating compositions of this invention include flow modifiers, such as the polysiloxane/polyether copolymers described more particularly by Frye in U.S. Pat. Nos. 4,308,315; 4,324,839 and 4,277,287, which are assigned to the same assignee as the present invention and are incorporated herein by reference. Suitable commercially available materials are SF-1066 and SF-1141 from General Electric Company, L-540 from Union Carbide and DC-109 from Dow Corning.

Other additives include thickening agents, pigments, dyes, anti-oxidants and the like for conventionally employed purposes in effective amounts which will be obvious to those skilled in the art. These are typically added to the solution after hydrolysis has been initiated. Thickening agents are more particularly described by Vaughn, Jr. in U.S. Pat. No. 4,309,319; adhesion promoting compounds are disclosed by Conroy in U.S. Pat. No. 4,311,763 and anti-oxidants are described by Anthony in U.S. Pat. No. 4,495,360; all of which are incorporated herein by reference.

The coating compositions of this invention can be applied to a substrate with or without priming of the surface of said substrate. Priming of the surface with a thermosetting or thermoplastic acrylic prior to application of the silicone coating compositions is often preferred and it can be accomplished using conventional methods. Suitable primers include those described in U.S. Pat. Nos. 4,207,357; 4,242,381; 4,284,685 and 4,486,565.

The cured compositions are useful as protective coatings on a large variety of surfaces, either transparent or opaque, including glass, plastic surfaces and metal surfaces. Suitable plastic surfaces include synthetic organic polymeric substrates, for example, acrylic polymers, polyesters, polyamides, polyimides, acrylonitrile-styrene copolymers, styrene-acrylonitrile-butadiene tertpolymers, polyvinyl chloride, butarates, polyethylene and the like.

Special mention is made of the polycarbonates, such as those polycarbonates known as Lexan ® polycarbonate resins, available from General Electric Company, including transparent panels made of such materials. The compositions of this invention are especially useful as protective coatings on the surfaces of such articles. These coating compositions may be applied by methods well known to the art, for example, by flow, spray or dip coating processes.

After the coating is applied to the substrate, the composition is preferably cured at temperatures of about 140° F. to about 300° F., depending on the stability of the substrate. The cured coating preferably has a final thickness of about 1 to about 20 microns with 3 to 12 microns being preferred.

The following examples illustrate particular embodiments of the present invention. It is not intended to limit the scope of this invention to these embodiments. All percentages are by weight unless otherwise indicated.

EXAMPLE 1

A coating composition was prepared by sequentially adding to 203 grams of methyltrimethoxysilane the following components, with continuous mixing:
(1) Nalcoag 1034-A colloidal silica, 34% $SiO_2$ in $H_2O$, pH=3.1, (125 grams)[1];
(2) Nyacol A-1510LP colloidal antimony oxide, 10% $Sb_2O_5$ in $H_2O$, pH=4–6 (47 grams)[2].

[1] Produced by Nalco Chemical Company [2] Produced by Nyacol Products, Inc.

The colloidal dispersion was stirred at room temperature for about 19 hours and then 375 grams of a 50/50 solvent mixture of isopropanol and n-butanol was added to obtain a composition having 20% solids and a pH of 3.2.

To 200 grams of the above coating composition, 8.2 grams of a 53% solution of 4-[gamma-(tri-(methoxy/ethoxy)silyl)propoxy]-2-hydroxy benzophenone, herein referred to as "m-SHBP", was added and mixed at room temperature, the ratio of methoxy to ethoxy being about 85:15 in this benzophenone. This composition is referred to herein as composition 1. To 150 grams of the above composition, 3.3 grams of 4-[gamma-(triethoxysilyl)propoxy]-2-hydroxy benzophenone, herein referred to as "e-SHBP", was added and mixed at room temperature. This composition is referred to herein as composition 2. A control composition, i.e., that which contains no UV absorber, is referred to herein as composition 3.

After aging the above solutions for about 3 weeks, the compositions were catalyzed with 1.5% choline acetate, based on solids, and flow-coated on 6"×8"×⅛" Lexan sheets primed with thermoplastic acyclic primer, sold by GE as SHP 300. These compositions were allowed to dry at room temperature for 30 minutes and then cured for 90 minutes at 130° C. The optical properties for these sheets are shown in Table 1 and the results of QUV weathering and abrasion resistance is shown in Table 2.

The abrasion test comprised abrading 4"×4" coated samples with 300 cycles on a Taber Abraser Model 174 with CS-10F wheels and 500 grams load and measuring percent haze values on a Gardner Hazemeter Model No. UX-10.

For the QUV test, a Q Panel Co. QUV was used in which samples are exposed to 8 hours of UV radiation from FS-40 lamps at 70° C. followed by 4hrs moisture condensation in dark at 50° C. The samples were then tested for delamination, microcracking and scribed adhesion.

The time to microcrack was when the first of such cracks appeared by visual inspection. The test for delamination comprised visually inspecting samples until spontaneous loss of adhesion occurred. The scribed adhesion was measured by a tape[3] pull test on a cross hatch pattern of 100 squares of 1 mm. size. Removal of any squares constitutes an adhesion failure. Discoloration was determined using Yellowness Index (YI) as measured in accordance with ASTM Yellow Index Test D1925-63T.

[3] Tape 710 produced by 3M Company.

TABLE 1

| | Initial Optical Qualities of Coatings | | | |
|---|---|---|---|---|
| Compositions | Weight % UV Absorber | % Haze | % Transmission | YI |
| 1 | 11% m-SHBP | 0.3 | 88.9 | 1.3 |
| 2 | 11% e-SHBP | 0.2 | 88.9 | 1.1 |
| 3 | None | 0.5 | 89.0 | 0.8 |

TABLE 2

| | Weathering Properties of Coatings | | | | | | |
|---|---|---|---|---|---|---|---|
| Composition | Weight & UV Absorber | Abrasion[1] | Scribed Adhesion[2] | Microcracking[2] | Delamination[2] | 340 hrs. | (680 hrs.) |
| 1 | 11% m-SHBP | 3.8 | 1440 | None | 1440 | 0.1 | 1.1 |
| 2 | 11% e-SHBP | 3.5 | 1440 | None | 1440 | 0.2 | 1.3 |
| 3 | None | 2.8 | 280 | None | 280 | 7.6 | — |

[1]Abrasion was determined as the change in percent Haze at 300 cycles.
[2]Adhesion, microcracking and delamination is given as time in hours within a QUV apparatus The data for the QUV and ΔYI (yellowness index) indicate that weathering properties of the coating compositions increased by a factor of 5 by the addition of the silylated hydroxybenzophenones without a significant change in the abrasion resistance of these coating compositions.

Although the above examples have described various embodiments of the present invention, modifications of these embodiments will be obvious to those skilled in the art and are considered within the scope of this invention.

What is claimed is:

1. A UV stabilized coating composition comprising a water/aliphatic alcohol solids dispersion of a partial condensate derived from organotrialkoxysilane and containing at least about 30 weight percent methyltrisilanol, and a colloidal dispersion of colloidal silica and a colloidal metal, colloidal metal alloy or colloidal metal salt, said metal being selected from the group consisting of antimony, aluminum, gold, silver, copper, tin, cadmium and indium, said dispersion comprising about 5 to 70 weight of the solid portion of the coating composition, and an effective amount of a silylated ultraviolet light absorbing agent capable of co-reacting with the organotrialkoxysilane and having the formula

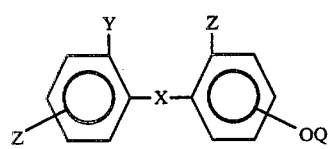

wherein
X is

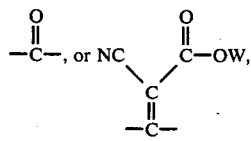

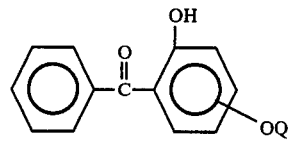

Y is H or OH; Z is H, OH, OQ or OW, where at least one Z in the ortho position is OH if Y is H; Q is —CH$_2$(CH$_2$)$_n$Si(R'')$_x$(OR''')$_y$ and W is —C$_m$H$_{2m+1}$ where x is 0, 1 or 2, y is 1, 2 or 3, x+y=3, n=0, 1 or 2, m=1 to 18, R'' is alkyl having 1 to 6 carbon atoms and each R''' is independently selected from the group consisting of alkyl or alkanoyl having 1 to 6 carbon atoms.

2. A coating composition as in claim 1 wherein the colloidal dispersion contains up to 30 weight percent of colloidal antimony oxide.

3. A coating composition as in claim 2 wherein the organotrialkoxysilane is of the formula R$^1$Si(OR)$_3$ wherein R$^1$ is selected from the group consisting of alkyl radicals of from 1 to 3 carbon atoms and aryl radicals of from 6 to 13 carbon atoms and R is selected from the group consisting of alkyl radicals of from 1 to 8 carbon atoms and aryl radicals of from 6 to 20 carbon atoms.

4. A coating composition as in claim 3 wherein the partial condensate is derived from about 30 to 100% CH$_3$Si(OR)$_3$ wherein R is as defined in claim 3.

5. A coating composition as in claim 3 wherein the partial condensate is derived from methyl trimethoxysilane.

6. A coating composition as in claim 2 wherein the coating composition contains sufficient acid to provide a pH of from 3 to 6.

7. A coating composition as in claim 2 wherein the coating composition contains from 10 to 50% solids.

8. A coating composition as in claim 1 wherein the silylated ultraviolet light absorbing agent is of the formula wherein the Q radicals are as defined in claim 1.

9. A coating composition as in claim 8 wherein Q is selected from the group of formulas consisting of —CH$_2$SiCH$_3$(OCH$_3$)$_2$;

—CH$_2$(CH$_2$)$_2$Si(OCH$_3$)$_3$;

—CH$_2$(CH$_2$)$_2$SiCH$_3$(OCH$_3$)$_2$;

—CH$_2$(CH$_2$)$_2$Si(CH$_3$)$_2$OCH$_3$;

—CH$_2$(CH$_2$)$_2$Si(OCH$_3$)(OCH$_2$CH$_3$);

—CH$_2$(CH$_2$)$_2$Si(OCH$_3$)(OCH$_2$CH$_3$)$_2$ and

—CH$_2$(CH$_2$)$_2$Si(OCH$_2$CH$_3$)$_3$.

10. A coating composition as in claim 1 wherein the silylated ultraviolet light absorbing agent is selected from the group consisting of 4-[gamma-(trimethoxysilyl)propoxy]-2-hydroxy-benzophenone and 4-[gamma-(tri(methoxy/ethoxy)silyl)propoxy]-2-hydroxy benzophenone wherein the methoxy to ethoxy ratio is from 4:1 to 6:1.

11. A coating composition as in claim 1 which comprises from 5 to 20 parts by weight silylated ultraviolet light absorbing compound to 100 parts by weight of solids.

12. A solid substrate having at least one surface coating with a cured composition of claim 1.

13. A solid substrate as in claim 12 which comprises polycarbonate.

14. A solid substrate as in claim 13 wherein a primer layer comprised of an acrylic resin is disposed between said solid substrate and the coating.

* * * * *